United States Patent
Schade

(10) Patent No.: US 6,473,831 B1
(45) Date of Patent: Oct. 29, 2002

(54) METHOD AND SYSTEM FOR PROVIDING UNIVERSAL MEMORY BUS AND MODULE

(75) Inventor: Peter A. Schade, Milpitas, CA (US)

(73) Assignee: Avido Systems Corporation, Newark, CA (US)

( * ) Notice: Subject to any disclaimer, the term of this patent is extended or adjusted under 35 U.S.C. 154(b) by 0 days.

(21) Appl. No.: 09/410,836

(22) Filed: Oct. 1, 1999

(51) Int. Cl.$^7$ ............................................. G06F 12/00
(52) U.S. Cl. ...................................... 711/115; 711/101
(58) Field of Search ................................ 711/115, 101; 365/230.05, 189.02, 189.03, 189.08; 710/100, 104

(56) References Cited

U.S. PATENT DOCUMENTS

| | | | | |
|---|---|---|---|---|
| 5,055,661 A | * | 10/1991 | Gochi | 235/492 |
| 5,565,704 A | * | 10/1996 | Tokuno | 257/678 |
| 5,628,028 A | * | 5/1997 | Michelson | 395/828 |
| 5,732,406 A | * | 3/1998 | Bassett et al. | 711/1 |
| 5,761,732 A | * | 6/1998 | Shaberman et al. | 711/157 |
| 5,860,142 A | * | 1/1999 | Cepulis | 707/205 |
| 5,938,750 A | * | 8/1999 | Shaberman | 710/102 |
| 6,067,593 A | * | 5/2000 | Schade | 710/305 |
| 6,088,785 A | * | 7/2000 | Hudson et al. | 712/35 |
| 6,122,216 A | * | 9/2000 | Dykes | 365/230.03 |
| 6,134,605 A | * | 10/2000 | Hudson et al. | 710/13 |
| 6,256,723 B1 | * | 7/2001 | Hudson et al. | 711/129 |

OTHER PUBLICATIONS (AMD, Am29F080B, Data Sheet Supplement for PROM Programmer Manufacturers, 6 pages) Sep. 1997.

* cited by examiner

Primary Examiner—Matthew Kim
Assistant Examiner—Stephen Elmore
(74) Attorney, Agent, or Firm—Sawyer Law Group LLP

(57) ABSTRACT

A memory card in accordance with the present invention allows a variety of memory devices to interface with a processor. The memory card comprises a data base which contains information about the variety of memory devices that are on the card and dual signal pairs that can be used to form different signal sets that are required to test or program the variety of memory devices. The memory card further comprises a plurality of reserved lines that can be used to form additional signal sets and a plurality memory areas. A memory card in accordance with the present invention comprises four different signal groups which allows memory modules that individually contain multiple memory types to be interfaced to a standard CPU. Such a memory bus is referred to as an X-Bus and the memory modules are referred to as X-Cards. The four signal groups of the X-Bus/X-Card combination are described below.

1. The X-Bus has a plurality of signals that connect to a device on the X-Card that contains information on all devices that exist on the X-Card. This device is referred to as the XDD (the X-Card Database Device).
2. The X-Bus also contains dual signal pairs that can be used to form different signal sets. These signal sets are required to test and or program typical memory devices such as FLASH programmable devices.
3. The X-Bus also provides a multiplicity of defined signals required to normally access most common memory types. One of these defined signals is a chip select signal (preferably #CS0), which is normally used to boot a computer system from reset.
4. Further, the X-Bus provides a multiplicity of reserved lines that can be used to form the different signal sets required for the testing, programming, and/or normal use modes of standard memory devices.

18 Claims, 9 Drawing Sheets

ADDR[0..25],DATA,
WE#,OE#,CE#,[0..1],REG#=0

ADDR[0..25],DATA,
WE#,OE#,CE#,[0..1],REG#=1

ADDR[0..19],DATA,
IORD#,IOWR#,CE#,[0..1]

200

X-Card Pin Assignments (1-60)

| Pin | Primary Use | Standard | +DRAM | Description |
|---|---|---|---|---|
| 1 | Power | VCC | | Power |
| 2 | Program | SVPP# | | Serial Program Supply |
| 3 | Program | HLD# | | Serial Hold |
| 4 | Standard | SRST# | | Serial Reset |
| 5 | Program | SWP# | | Serial Write Protect |
| 6-8 | Standard | SA0-2 | | Serial Addr. Select |
| 9-10 | Standard | XD0-1 | | XDD Protocol |
| 11 | Standard | LVSTAT | | Low VCC Status |
| 12-15 | Expansion | RSD0-3 | | Reserved Lines |
| 16-25 | Standard | A0-A9 | | Address Lines |
| 26 | Program | FA9 | | Flash Address Line |
| 27-33 | Standard | A10-16 | | Address Lines |
| 34 | Standard | VCC | | Power |
| 35-43 | Standard | A17-25 | | Address Lines |
| 44 | Standard | RST# | | Reset |
| 45 | Standard | WE# | | Write Line |
| 46 | Standard | GND | | Ground |
| 47 | Program | FEW# | | Flash Write Enable |
| 48-49 | Standard | CE3-4# | | Chip Select |
| 50 | Program | FOE# | | Flash Out Enable |
| 51 | Standard | OE# | | Output Enable |
| 52-54 | Standard | CE0-2# | | Chip Select |
| 55 | Standard | RY/BY# | | Ready/Busy |
| 56 | Program | WP# | | Write Protect |
| 57 | Program | RP# | | Reset Power Down |
| 58 | Program | 3/5# | | 3V/5V Select |
| 59 | Program | VPP | | Program Supply |
| 60 | Standard | VCC | | Power |

FIG. 8A

X-Card Pin Assignments (61-120)

| Pin | Primary Use | Standard | +DRAM | Description |
|---|---|---|---|---|
| 61 | Standard | VCC | | Power |
| 62 | Standard | SEN# | | Serial Enable |
| 63-64 | Standard | SCK1-2 | | Serial Clocks |
| 65 | Standard | SRY/BY# | | Serial Ready/Busy |
| 66 | Standard | SO | | Serial Out |
| 67 | Standard | SI/SIO | | Serial In/Out |
| 68-70 | Standard | SCE0-2# | | Serial Chip Select |
| 71 | Standard | SCK2 | | Serial Clock 2 |
| 72 | Standard | GND | | Ground |
| 73 | Expansion | RSD7 | WED# | Reserved/WE# DRAM |
| 74, 76, 78, 80 | Expansion | RSD8, 10, 12, 14 | DP0-3 | Reserved/Parity Data Lines |
| 75, 77, 79, 81 | Expansion | RSD9, 11, 13, 15 | CS0-3# | Reserved/DRAM CAS |
| 82 | Power | GND | | Ground |
| 83-86 | Expansion | RSD16-19 | RS0-3# | Reserved/DRAM RAS |
| 87-102 | Standard | D0-15 | | Data Lines |
| 103 | Power | GND | | Ground |
| 104-119 | Expansion | RSD20-35 | | Reserved Lines |
| 120 | Program | GND | | Ground |

FIG. 8B

METHOD AND SYSTEM FOR PROVIDING UNIVERSAL MEMORY BUS AND MODULE

STATEMENT OF RELATED APPLICATIONS

This application is related to U.S. Pat. No. 6,067,593, dated May 23, 2000.

FIELD OF THE INVENTION

The present invention relates to memory bus architecture, and in particular to a memory bus capable of interfacing to memory modules which hold a multiplicity of different types of memory devices.

BACKGROUND OF THE INVENTION

Many types of memory exist in a modem computer system including static RAM, dynamic RAM, programmable FLASH, and magnetic disks. Over the years the physical locations of these memories have become separated due to various electrical and physical differences between the memory types. Helped by the increasing miniaturization of memories, it is now become possible to combine these memories on a few subassemblies or modules.

However, due to a number of factors, previous attempts at producing memory modules which incorporate different types of memory on the same module have failed to find widespread acceptance. It is the purpose of this invention to describe the necessary characteristics of a universal memory bus that allows properly constituted memory modules to incorporate a wide variety of memory types. the 1960's, DRAM memory modules were introduced by Wang Computer and subsequently by many other manufacturers. Many benefits resulted from placing multiple DRAM memory chips on a removable memory module instead of directly on the same printed circuit board (PCB) as the CPU. These include saving space on the CPU board, efficiency of manufacturing and testing, and allowing the user of the computer system to easily upgrade the amount of DRAM memory in his system.

Because of the benefits just described, DRAM memory modules are now the standard means by which DRAM is included in a computer system. Also, because it is recognized that other types of memory besides DRAM memory can benefit from placement on similar modules, memory module standards can include specifications for other types of memory. The standards for the most common memory modules are done by an international committee called JEDEC and are defined in JEDEC JESD 21 C Solid State Memory Standards. The following discussion looks at a specific JEDEC 100 pin DIMM Standard (JEDEC Standard No.21-C 4.4.8) in order to illustrate one means by which different types of memory can be placed in the same physical form factor.

The JEDEC 100 pin DIMM standard has assigned pins for three types of memory devices; namely DRAM, SDRAM, and ROM. FIG. 1 of this patent illustrates how two 100 pin DIMM modules 14 and 16 with different memory types can be placed in the same computer system 10. The connection scheme for the two 100 pin DIMM modules 14 and 16 shown in FIG. 1 avoids signal conflicts between different types of memory by restricting each individual module 14 and 16 to only one type of memory device per memory module.

However, it is desirable to allow a memory bus to be connected to a suitable memory module that contains a variety of types of memory devices. The desired memory bus 12' and module 18 are shown in FIG. 2. To understand the problems associated with the memory module scheme of FIG. 2, three new terms will be introduced; namely, "memory element", "memory use mode", and "memory signal set". The term "memory element" refers to either a memory chip or memory module. The definition of the terms "memory use mode" and "memory signal set" will be made clear in the subsequent paragraphs.

All the signals of a memory element can be divided in four signal groups; power, control, address, and data. The power lines provide the energy for the chip to function. The address lines are used to access a specific location of memory. The data lines provide the information at the addressed locations. And the control lines provide the direction and control of the data transfer.

Now comes the central question with respect to producing a workable memory module with multiple types of memory. If we include a complete set of power, control, address, and data signals in the connector of our universal memory element, would we not have a working multi-memory element?

End The answer to the above question is no; because the signal definition for any given pin on a memory element can be different depending the actual memory use mode of the memory element.

An example of more than one use for a particular memory pin is described herein below. Parallel EPROM/FLASH memories typically hold the boot code for standard Personal Computers. These memories are used because they retain their programmed data when powered down yet provided fairly fast access to this same data when powered up. The signals of a parallel EPROM/FLASH memory include an address line described as A9. When such a memory is normally used in a computer system, the address line A9 is wired like all the other address lines of the device and is connected to line A9 of the local CPU 102 bus. FIG. 3A illustrates the connection of the address line A9 to line A9 of the CPU 102.

However, when the EPROM/FLASH is programmed with the boot code for the CPU, by convention, a special super voltage is placed on A9 along with other suitable signals in order to allow a PROM programmer (a test instrument) to identify the actual type of EPROM being programmed. FIG. 3B illustrates the connection of the address line A9 of the EPROM/FLASH device 104 to a super voltage. The identification number read is usually a four byte hexadecimal number and is called the device's silicon signature. Thus we see that the signal definition of A9 for the typical boot EPROM/FLASH device 104 depends upon whether the chip is in the programming mode or in the normal memory access mode.

When both the EPROM/FLASH device 104 and a non-programmable memory such as a DRAM are placed on the same memory card, a programming problem will occur. Namely, if A9 of the programmable memory is connected to A9 of the DRAM, we will not be able to place a super voltage on A9 to read the silicon signature of the EPROM/Flash us memory because it will harm the DRAM. If on the other hand, we keep them separate, the two different memory devices will not share the same signals on the memory bus.

Other common parallel EPROM and FLASH signals lines which often have super voltage values (e.g. 12 volts) applied during the programming mode include the memory chip select, output enable, write enable, and the reset/power down lines. For EPROM's, these super voltages often need to be applied for programming of the main memory array. In FLASH devices, these signals are typically needed to program special sections of the device for protection of sectors from regular programming which are commonly referred to as "boot block sectors".

All of the groups of signals required for the various modes of programming form a group of "programming signal sets" for the "program use mode". An accommodation for many of the super voltages required for the programming signal sets is typically absent from current memory module design. Only the intended memory use mode of the memory device is considered when selecting the actual signals that constitute the signal lines of the memory module. This is precisely the case with the JEDEC 100 pin DIMM standard reviewed earlier.

When all of the memory devices on a memory module are of the same device type, this will normally not present a problem in terms of programming. However, in the case of a Ids mixed memory type module, the inability to connect the correct programming signal sets will prevent full testing and programming of the programmable device on a module.

It is important to note that all memory elements including non-programmable memory elements have at least two different memory use modes; namely, a group of test modes and also the normal intended memory read and write access modes. These latter as modes will be referred to as the "normal use modes". Since the signal sets required for testing non-programmable devices may also conflict with the signal sets required for the normal use mode, the mixing of different types of memory on any give module may present real conflicts due to differences in the test modes between each type.

In addition, every programmable memory element has at least three different memory use modes; namely test mode(s), programming mode(s), and normal use mode(s). Typically, the memory manufacturer will be concerned with all three modes. The PROM programmer manufacturer will normally be concerned with only the programming mode(s). The user of the memory element will be concerned with at least the normal use mode(s) and sometimes with the programming mode(s) if in circuit programming is desired.

To simplify the discussion of these memory element use modes, the term "signal set" will now be defined. A signal set is a group of signals that are required on a memory element for performing an operation in a valid memory element use mode. Typical signal sets for a programmable memory element include the following types of signal sets; test sets, programming sets, info sets, and normal use mode sets.

The general definitions for these signal set categories are self explanatory with the possible exception of the info set. The info set refers to the collection of signals commonly found on a memory element which allow the CPU to access specific module and signal information about the element. Common synchronous dynamic memory (SDRAM) DIMM modules include a special EEPROM serial device referred to as the "serial presence detect" device (SPD device) which include a data base of information about the characteristics of the SDRAM on the module memory. The signal set used to get this information from the SPD device constitutes an info set.

In the case of a programmable memory device supporting silicon signatures, the set of signals required to read the device silicon signature function belong to an info signal set in the programming use mode. Another example of an info signal set in the normal use mode is the signals on the PCMCIA connector which allow reading the card information structure (CIS) data base of a PCMCIA card.

As has been discussed, standard JEDEC memory modules do not contain multiple types of memory devices. However, there is another standard type of memory module or card that is capable of satisfying this requirement and that is one designed to the PCMCIA (or PC-Card) standard.

The original PCMCIA or (PC-Card) bus is a 68 pin bus which allows for different types of memory to reside on one module (4). Although designed originally for non-multiplexed 8 bit and 16 bit data buses, the newer Card Bus standard allows for a multiplexed 32 address/data bus. The following remarks refer to the older standard (PCMCIA 2.1/JEIDA 4.2) but apply equally well to the newer 32 bit bus standard.

The signals of the PCMCIA define three "memory spaces". By "memory space" we mean a decoded memory region. These three regions are shown in FIG. 4 and are commonly referred to as the Common Memory area 204, the Attribute Memory area 202 or (CIS area), and the I/O area 206. Selection of either the Common Memory area 204 or CIS area 206 is performed with the Reg# line (pin 61). If during a memory access where OE#(pin 9) or WE# (pin 15) are asserted and the #Reg line is low, the CIS memory area 202 is selected. Alternatively, when #Reg is high, the Common Memory area 204 is selected. Selection of the I/O area 206 is performed by choice of a different Read/Write signal pair; namely IOWR# (pin 44) or IOWR# (pin 45). With regard to programmable devices, the PCMCIA bus has two VPP or super voltage lines.

The Attribute Memory area 202 is included on the PCMCIA bus to allow the system CPU accessing the PCMCIA card to obtain information on the intended purpose of the card such as Fax/Modem, Ethernet, solid state disk (ATA card), or linear SRAM or Flash card. The information is stored on the card in a data base structure called the Card Information Structure (CIS). Similar to the SPD device on SDRAM modules described earlier, the CIS device shares restricted status with the main memory devices that are normally found in the Common Memory area 204. However, because both the CIS memory area 202 and the Common Memory area 204 share the same address and control pins (except for the #Reg line), a PCMCIA Linear or ATA memory card is a good example of a module with multiple types memory residing on the same card.

The PCMCIA 200 bus has two main limitations as a multiple memory bus. First, it lacks many of the common signals required by modem DRAM memory such as the. multiplexed address strobe signals RAS and CAS and no apparent way to add these signals. Secondly, although there are two VPP super voltage lines which can be used to program common programmable memory chips such as EPROM and Flash memory, the PCMCIA bus has no provision for taking care of super voltages used on such lines as the output enable line or address line A9.

Rephrasing the last statement in terms of the concept of signal sets, the PCMCIA does not provide any direct means by which the use of multiple signal sets can be applied to different types of memory devices on a PCMCIA card.

Michelson in U.S. Pat. No. 5,628,028 presents a way around these limitations of the PCMCIA bus. This is shown in FIGS. 5A and 5B. The Michelson solution is to include a field programmable gate array (FPGA) on the PCMCIA card. This addition along with an appropriate program on the host computer allows for a wide variety of memory operations on the PCMCIA card. A short synopsis of the Michelson method is as follows.

1. The CIS region is read by the host computer which then knows that a PCMCIA card is available that requires its FPGA to be loaded through the PCMCIA bus.
2. The FPGA is loaded with correct data which modifies how the common memory region will respond to memory requests.

As shown in FIG. 5A, the FPGA 302 is now a memory controller which, for example, can change the asynchronous, non-multiplexed common memory space of the PCMCIA bus into a synchronous, multiplexed address bus of SDRAM memory 304. Also as shown in FIG. 5B, the FPGA 302 can act as converter of signal sets so that both a PROM programming signal set and a normal mode signal set can be accessed through the same PCMCIA bus signals.

The PCMCIA bus standard along with the FPGA arrangement disclosed in Michelson is indeed a solution to how multiple types of memory can coexist on the same memory module. Unfortunately, the requirement that the memory card incorporate an FPGA which must act as a memory controller means that the high speed signal requirements of many fast synchronous SDRAM memories will be difficult if not impossible to meet. Secondly, the restriction that the host computer must access the CIS region and load the FPGA with the appropriate code adds complexity to its use. Thirdly, the requirement of adding the hardware to the PCMCIA card as well as the storing and loading the appropriate FPGA code to allow different signal sets to be applied to the PCMCIA bus for performing typical programmable memory programming tasks is also a difficult and expensive task.

For the reasons stated above, commercial PCMCIA cards are largely restricted to signal memory type usage, do not support DRAM devices, and fail to allow programming of Flash devices except in programming modes that do not require super voltages on pins such as OE, WE, or A9.

Accordingly, what is needed is a system and method for allowing a variety of memory devices to be utilized as one memory module. The method and system should be easily implemented, cost effective and compatible with existing memory bus architectures. The present invention addresses such a need.

SUMMARY OF THE INVENTION

A memory card in accordance with the present invention allows a variety of memory devices to interface with a processor. The. memory card comprises a data base which contains information about the variety of memory devices that are on the card and dual signal pairs that can be used to form different signal sets that are required to test or program the variety of memory devices. The memory card further comprises a plurality of reserved lines that can be used to form additional signal sets and a plurality of memory areas.

A memory card in accordance with the preseat invention comprises four different signal groups which allows memory modules that individually contain multiple memory types to be interfaced to a standard CPU. Such a memory bus is referred to as an X-Bus and the memory modules are referred to as X-Cards. The four signal groups of the X-Bus/X-Card combination are described below.
1. The X-Bus has a plurality of signals that connect to a device on the X-Card that contains information on all devices that exist on the X-Card. This device is referred to as the XDD (the X-Card Database Device).
2. The X-Bus also contains dual signal pairs that can be used to form different signal sets. These signal sets are required to test and or program typical memory devices such as FLASH programmable devices.
3. The X-Bus also provides a multiplicity of defined signals required to normally access most common memory types. One of these defined signals is a chip select signal (preferably #CS0), which is normally used to boot a computer system from reset.
4. Further, the X-Bus provides a multiplicity of reserved lines that can be used to form the different signal sets required for the testing, programming, and/or normal use modes of standard memory devices.

BRIEF DESCRIPTION OF THE DRAWINGS

FIGS. 8A and 8B show a pin description for an X-Card with EEPROM, Flash, and DRAM.

DETAILED DESCRIPTION

The present invention relates to memory bus architecture, and in particular to a memory bus capable of interfacing to memory modules which hold a multiplicity of different types of memory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
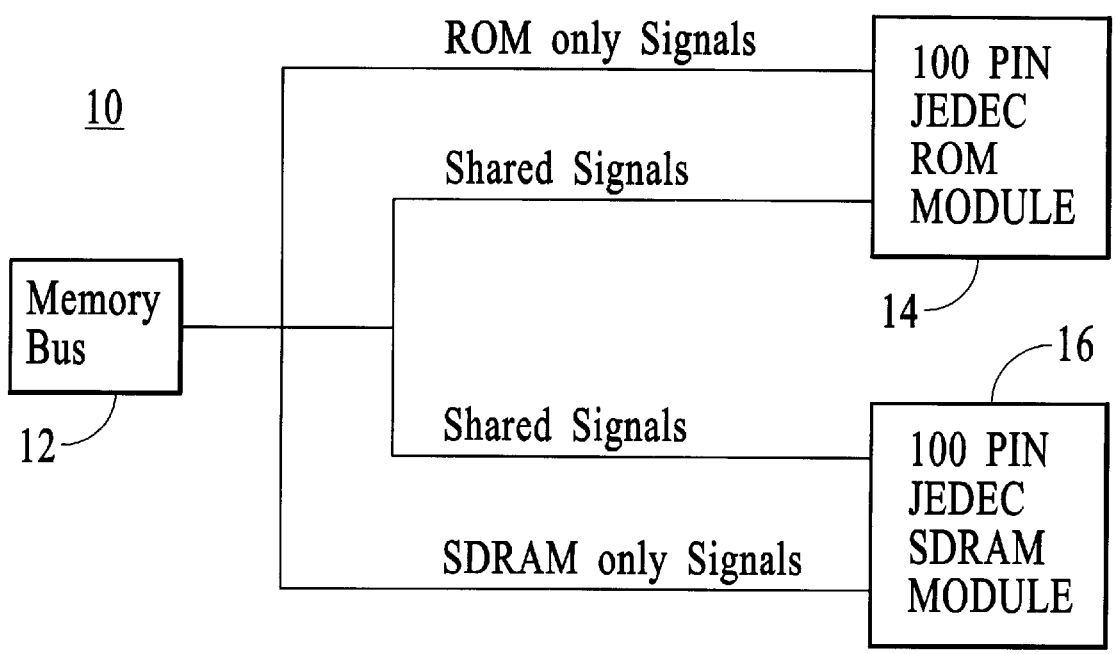
FIG. 1 shows two 100 Pin JEDEC DIMM memory modules with different memory types.
Figure 2:
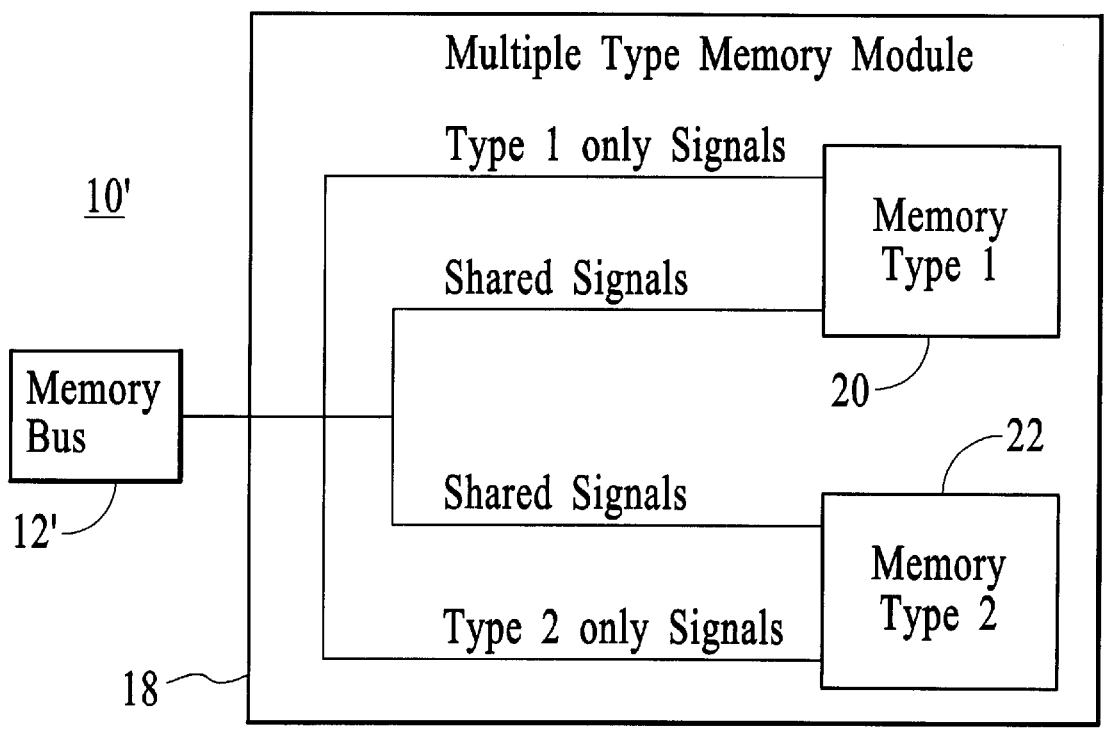
FIG. 2 illustrates memory module which has different memory types.
Figure 3A:
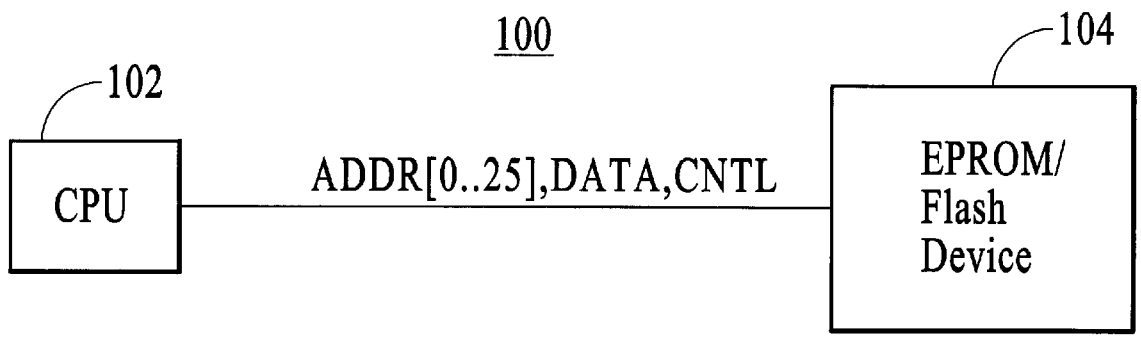
FIGS. 3A and 3B show the multiple use of A9 on a programmable memory device.
Figure 3B:
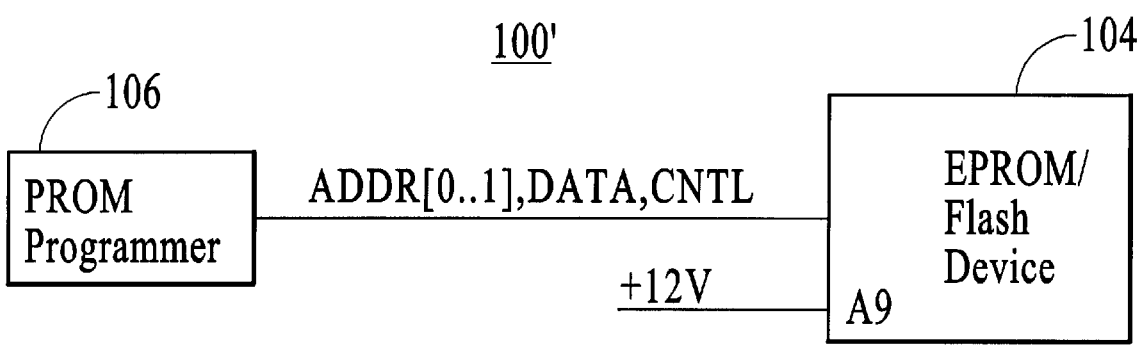
Figure 4:
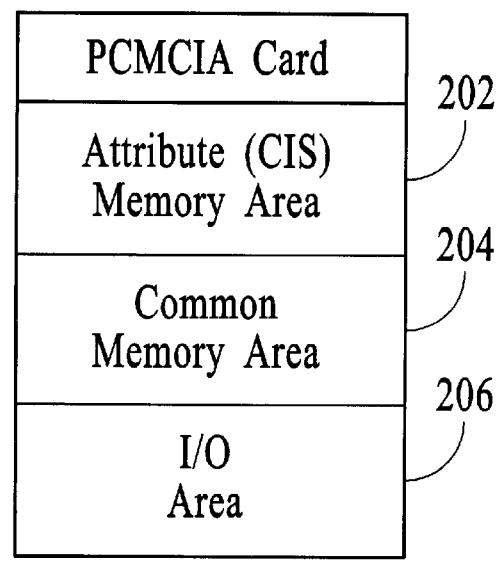
FIG. 4 shows the three PCMCIA decoded areas.
Figure 5A:
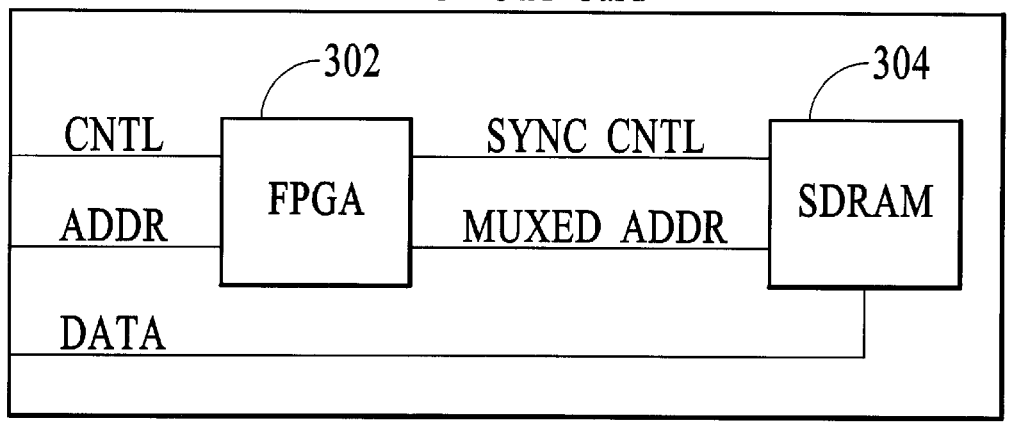
FIGS. 5A and 5B show a PCMCIA card with an FPGA used as (A) a memory controller and (B) as a programmable signal converter.
Figure 5B:
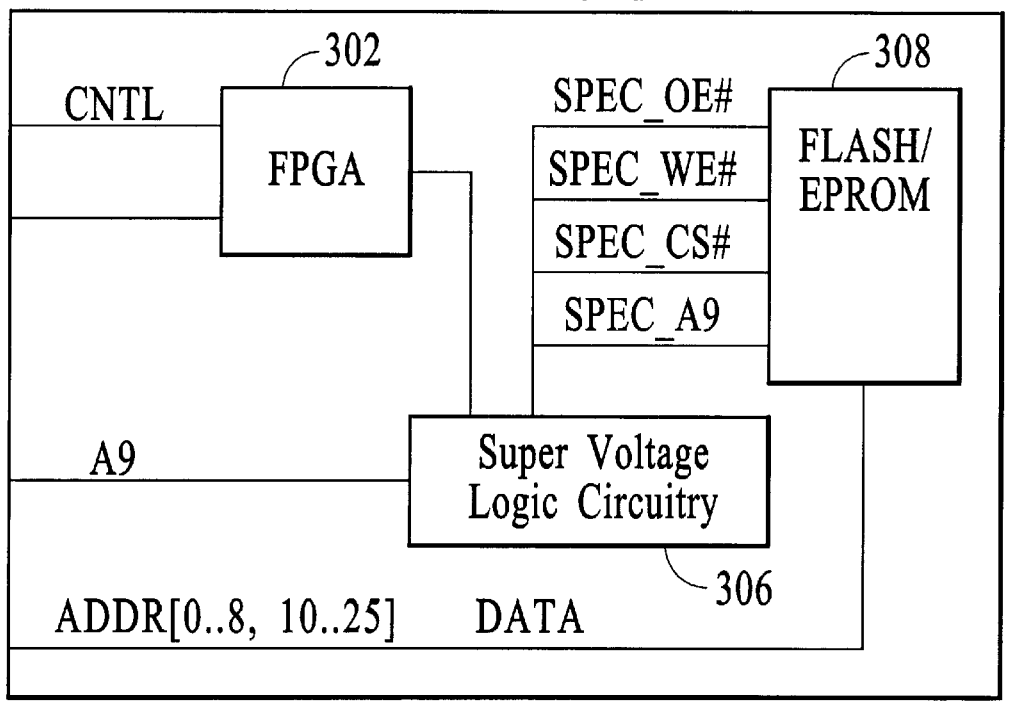
Figure 6:
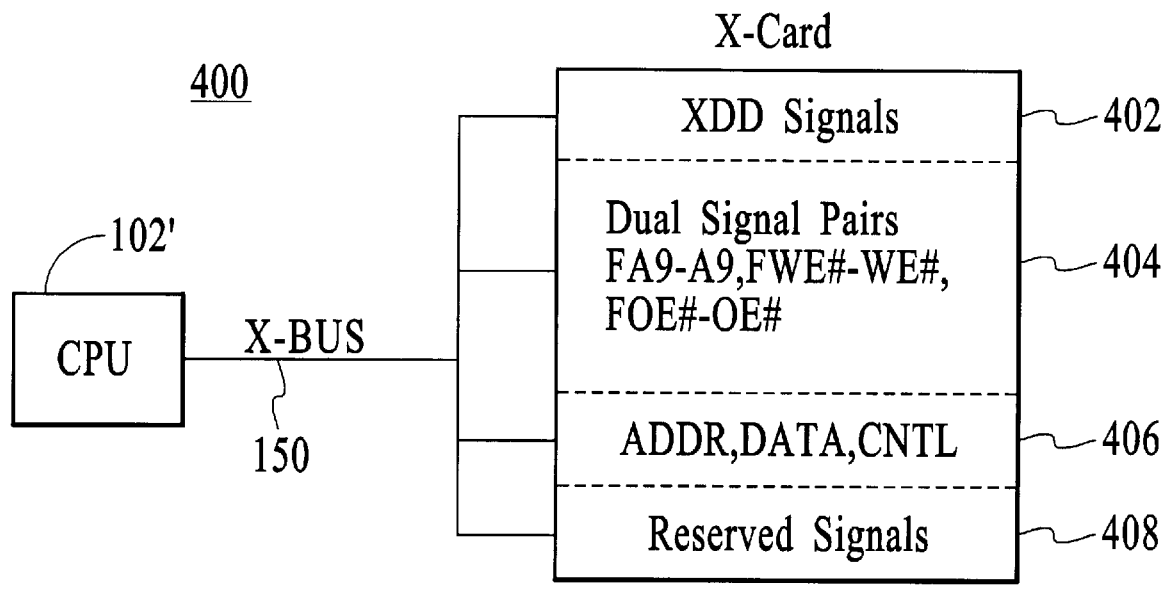
FIG. 6 shows a CPU connected to an X-Card and X-Bus.
Figure 7:
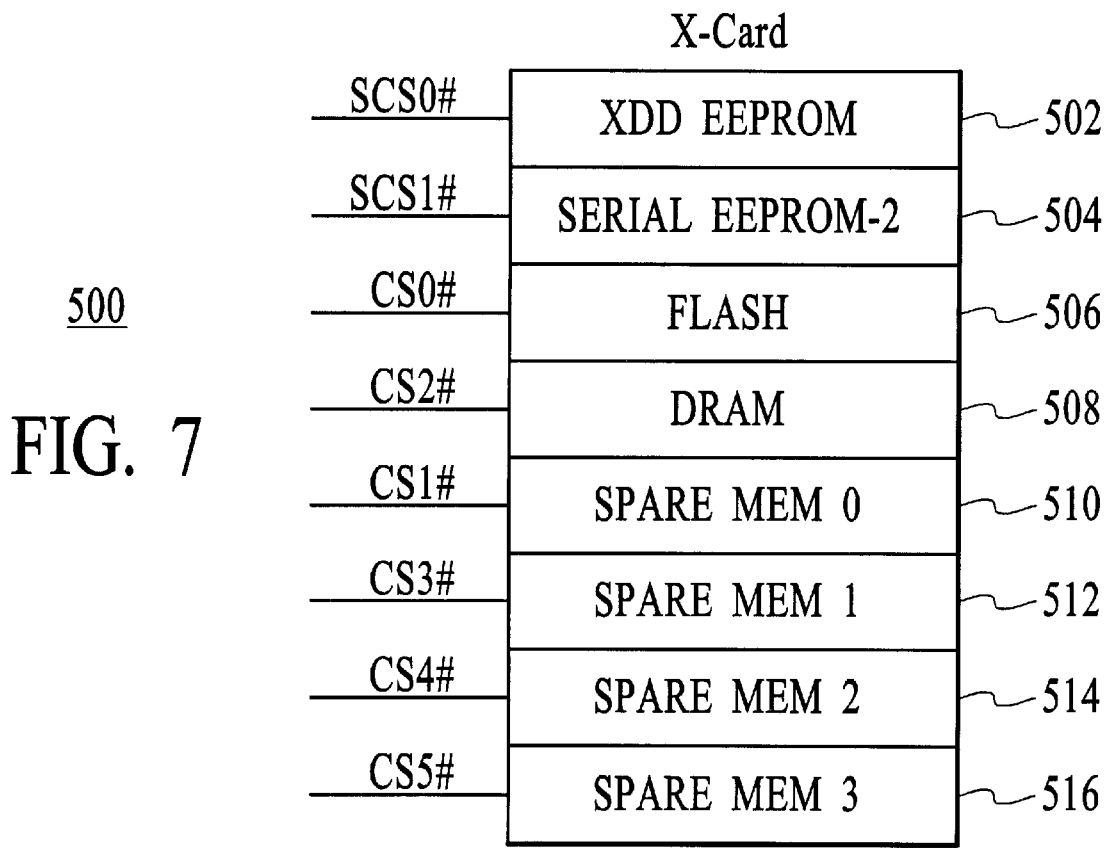
FIG. 7 shows an X-Card with multiple types of memory.

FIG. 6 shows a computer system with an X-Bus 150 and X-Card 400 in accordance with the present invention. A CPU 102' is connected to an X-Card 400 via an X-Bus 150 through which address, data, and control signals flow. The X-Card 400 may include different types of parallel and serial memories such as EEPROM, FLASH, SRAM, and DRAM memory devices. FIG. 7 illustrates an X-Card 500 that can support a combination of serial EEPROM, parallel FLASH, and asynchronous DRAM all coexisting on the same card while still allowing full testing and programmability of all the memory devices and providing a number of reserved pins for future expandability. FIGS. 8A and 8B show the pin assignments for the X-Card of FIG. 7.

The signal group labeled "Standard" represent those signals which are used with an X-Card that includes only an XDD device and one parallel ROM device. The signals labeled "DRAM" show the use of the reserved lines to accommodate additional memory devices such as the DRAM memory in this example.

X-Bus Element I: The XDD Device

Because there may be different types of memory residing on an X-Card, there is a need for each X-Card to contain a descriptive device (referred to as the X-Card Descriptive Device or XDD) so that the interfacing computer system can find out the exact memory that exists on the X-Card. The XDD serial device of the preferred embodiment of FIGS. 8A and 8B is similar to the SPD (serial presence detect) device of common SDRAM modules (8) in that it provides detailed knowledge of the memory on the X-Card. The main difference is that the database stored in an SPD describes a single memory type while the XDD database describes a multiplicity of memory devices. It should be noted that the XDD device is also useful when testing the X-Card as it can hold the parameters needed for testing the card as well as test results and time marking information.

X-Bus Element II: the Dual Signal Pairs for Different Signal Sets

Memory devices and in particular programmable memory devices will have different signal sets depending upon the mode that they are addressed. For instance, a programmable Flash memory may have one or more signal sets used by the manufacturer during testing the device. A different signal set may be used by the PROM programmer in order to address or program a specific memory area in Flash devices. And finally, there always is the default or standard signal sets which are used to access the memory in its normal read and/or write modes.

Figure 9A:
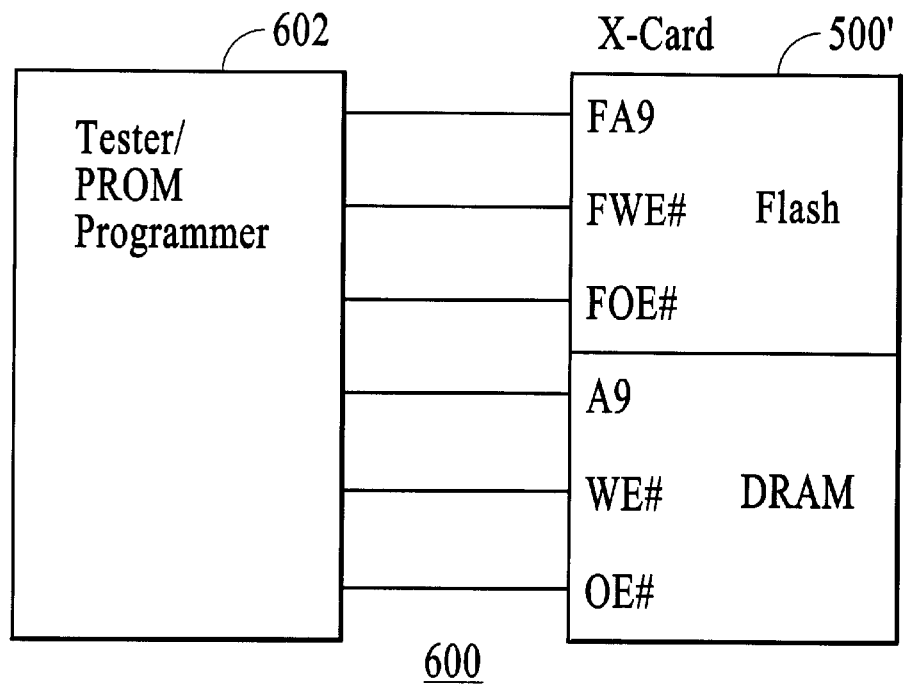
FIGS. 9A and 9B show the X-Bus signal pairs in the (A) programming mode and (B) in the normal mode.
Figure 9B:
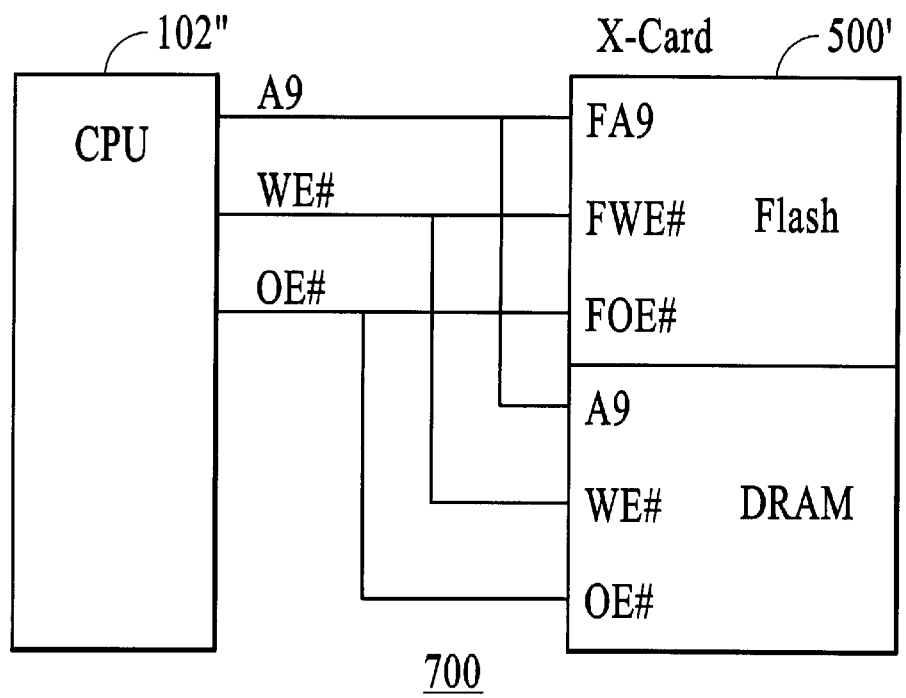

As a specific example, the X-Card 400' in FIG. 7 has the following dual signal pairs for addressing the parallel Flash memory device; FA9 and A9, #FOE and #OE, and #FWE and #WE. As shown in FIG. 9A, these signals are commonly used by TESTER PROM programmer 600 to perform special programming operations on programmable memories (9). Since the signals FA9, #FOE, and #FWE are only connected to the programmable devices on the X-Card, when super voltages are applied to these pins, they do not injure the other memory types on the X-Card. When, on the other hand, as shown in FIG. 9B, the standard signal set is applied to the X-Card 400' to both read and write the non-protected regions of the Flash memory as well as read and write the other memory elements that share the common address lines, these dual function pins can be simply shorted together for correct operation.

Other special signals used in testing or programming can be simply connected to ground or VCC through a resister to allow the various signal sets of the X-Card memory devices to be addressed. These special signals may be allocated from the reserved pins of the X-Bus.

X-Bus Element II: A Multiplicity of Standard Signal Types

As shown in the preferred embodiment of FIG. 7 and FIGS. 8A and 8B, the X-Bus will typically include the common signals of multiplexed as well as non-multiplexed parallel devices as well as the signals required by serial devices.

FIG. 7 shows the large number of memory spaces provided by the preferred embodiment of FIGS. 8A and 8B. The X-Card has at least two memory spaces and usually many more. The one that is always required is the memory space occupied by the XDD device. If in addition, the parallel memory space addressed by #CS0 is occupied by a ROM, is EPROM or FLASH device, the computer system of FIG. 6 utilizing an X-Card 400' of FIG. 7 and FIG. 8A and 8B is assured of two important functions.

1. The system is capable of booting off of the memory addressed by #CS0.
2. The system can identify all of the memory elements on any given X-Card by use of the XDD device.

X-Bus Element IV: A Multiplicity of Reserved Lines

The X-Bus includes a multiplicity of reserved lines. As was discussed earlier, JEDEC memory card line definitions such as the described 100 DIMM standard also designated reserved lines which were created when a particular type of memory did not require a certain type of signal that was used by a different memory type. The X-Bus expands on this notion by providing a large number of lines that are not used by the standard signal set of any particular memory. By addition of these reserved lines, an X-Bus can easily adapt to new types of memory or different signal sets required for testing or programming the X-Card memory devices.

Extension of the Preferred Embodiment by use of an FPGA

Figure 10:
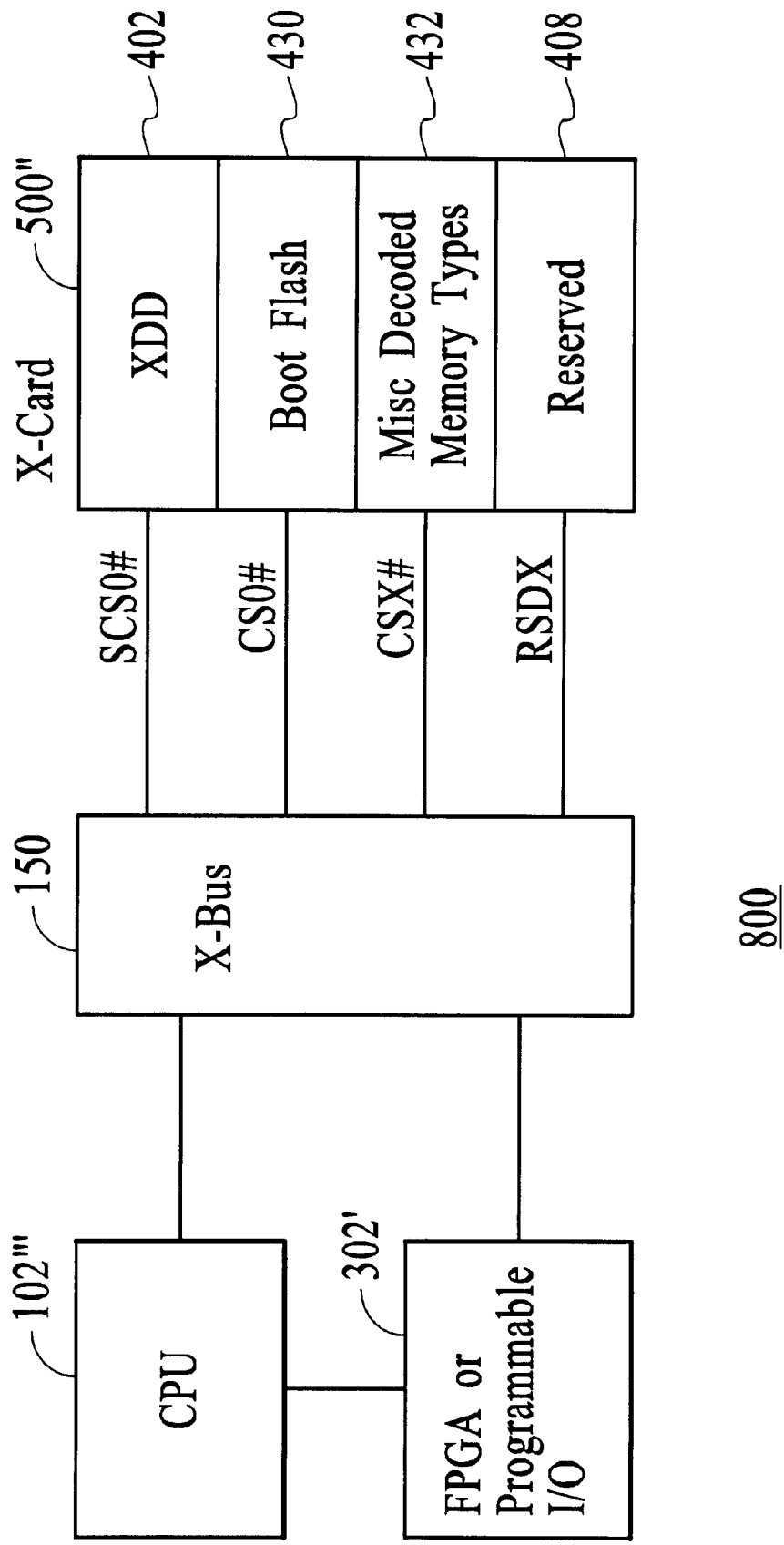
FIG. 10 shows an X-Card with a programmable tester.

FIG. 10 shows how the functionality of an X-Card can be greatly expanded by use of an external device of programmable lines embodied in an FGPA or programmable I/O Group 302'. The key elements in FIG. 10 are as follows: the X-Card 500" reserved lines 408, the XDD device 402, the group of programmable lines 302' connected to the reserved X-Bus lines, the controlling CPU 102", a read only memory type such as a BOOT Flash device 430 addressed by #CS0, and a non specified parallel memory type 432 addressed by the X-Bus signal #CSX.

The sequence of events for a CPU to adjust to an unknown type of memory on an X-Card is as follows.

1. The CPU 102" boots using #CS0 on the X-Card which addresses a BOOT FLASH device 430.
2. The CPU 102" reads the XDD device 402 and learns of a particular type of memory on the #CSX line of the X-Cards 500".
3. The CPU changes the mode of the programmable lines 302' connected between it and the reserved lines of the X-Card 408".
4. The CPU addresses the new type of memory using CSX as well as the reserved lines RSX that are now active.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in

What is claimed is:

1. A memory module which allows a variety of memory devices to be coupled to a processor, the memory module comprising;

a database which contains information about the variety of memory devices that are on the module;

dual signal pairs that are used to form different signal sets that are required to, test or program the variety of memory devices; and a plurality of reserved lines that are used to form additional signal sets.

2. The memory module of claim 1 which further includes a plurality of memory areas, at least one memory area being accessible to boot the processor from reset.

3. The memory module of claim 1 which further includes a plurality of standard signal types.

4. The memory module of claim 3 which further includes a plurality of programmable lines.

5. The memory module of claim 4, wherein the variety of memory devices comprises at least one Dynamic Random Access Memory (DRAM).

6. The memory module of claim.4, wherein the variety of memory devices comprises at least one parallel Flash memory device.

7. The memory module of claim 4, wherein the variety of memory devices comprises at least one serial data Flash memory device.

8. The memory module of claim 4 in which the variety of memory devices interfaces with the processor through a directly coupled memory bus.

9. The memory module of claim 4 wherein a programmable I/O device is utilized with at least one of the plurality of reserved lines to increase the functionality of the memory module.

10. The memory module of claim 9 wherein a programmable I/O device comprises an FGPA.

11. A system, comprising:

a processor; and a memory module coupled to the processor, the memory module comprising:

a variety of memory devices, comprising:

at least one of a first memory device of a first memory type, and at least one of a second memory device of a second memory type, a database which contains information about the variety of memory devices that are on the module; dual signal pairs that are used to form different signal sets that are required to test or program the variety of memory devices; a plurality of reserved lines that are used to form additional signal sets; and a single memory bus coupled to the variety of memory devices, wherein the single memory bus provides communication between the processor and the variety of memory devices.

12. The system of claim 11, wherein the variety of memory devices further comprises:

at least one of a third memory device of a third memory type, wherein the at least one of the third memory device stores an identification data describing the device composition of the memory module.

13. The system of claim 11, wherein the variety of memory devices comprises at least one DRAM.

14. The system of claim 11, wherein the variety of memory devices comprises at least one parallel Flash memory device.

15. The system of claim 11, wherein the at least of a third memory device comprises at least one serial data Flash memory device.

16. The system of claim 11 wherein the coupled memory bus comprises:

dual signal pairs that can be used to form different signal sets that are required to test or program the variety of memory devices; and a plurality of reserved lines that can be used to form additional signal sets.

17. The system of claim 16 wherein a programmable I/O device is utilized with at least one of the plurality of reserved lines to increase the functionality of the memory module.

18. The system of claim 17 wherein a programmable I/O device comprises an FPGA.

* * * * *